United States Patent [19]

Brewbaker

[11] 4,347,343

[45] Aug. 31, 1982

[54] THICKENED VINYL ESTER RESIN COMPOSITIONS

[75] Inventor: James L. Brewbaker, Midland, Mich.

[73] Assignee: The Dow Chemical Company, Midland, Mich.

[21] Appl. No.: 226,963

[22] Filed: Jan. 21, 1981

[51] Int. Cl.$^3$ .............................................. C08L 63/00
[52] U.S. Cl. .................................... 525/530; 525/404; 525/438; 525/531; 525/532; 525/922
[58] Field of Search ............... 525/530, 531, 532, 404, 525/438, 922

[56] References Cited

U.S. PATENT DOCUMENTS

| | | | |
|---|---|---|---|
| 3,523,143 | 8/1970 | Kwong | 525/438 |
| 3,524,902 | 8/1970 | Feltzin | 525/438 |
| 3,651,649 | 3/1972 | Najvar | 525/530 |
| 3,669,911 | 6/1972 | Najvar | 525/922 |
| 3,808,114 | 4/1974 | Tsuschihara | 525/438 |
| 3,836,600 | 9/1974 | Brewbaker | 525/89 |
| 3,882,187 | 5/1975 | Takiyama | 525/438 |
| 3,947,422 | 3/1976 | Tatum | 525/531 |
| 4,085,018 | 4/1978 | Ariga | 525/532 |

*Primary Examiner*—Paul Lieberman

[57] ABSTRACT

Curable vinyl ester resin compositions, that can be B-staged with magnesium oxide, comprise a vinyl ester resin having no free carboxyl groups, a reactive diluent, and a thickening agent which is the reaction product of a polyethylene glycol having a molecular weight greater than 2,000 and an anhydride of a polycarboxylic acid with the thickening agent having more than two carboxyl groups per molecule.

12 Claims, No Drawings

THICKENED VINYL ESTER RESIN COMPOSITIONS

BACKGROUND OF THE INVENTION

Vinyl ester resins are liquid thermosetting resins which are the reaction product of about equivalent amounts of a polyepoxide and an unsaturated monocarboxylic acid. Those resins are often used in combination with fibrous reinforcement and inert fillers to manufacture composite structures. One way to make such composite structures is to premix the resin, filler, fibrous reinforcement and other necessary additives to form a molding compound. The molding compound can then be formed into the desired shape and cured in a heated matched metal die. An improvement in the process is chemical thickening of the relatively low viscosity liquid resin to form a high viscosity gel after the resin has been mixed with all the other ingredients in the molding compound. This thickening or B-staging has several advantages. Unthickened molding compounds are sticky masses which are difficult to handle. After B-staging, they are firm solids whose surfaces are dry. In this form they are easily handled. During the molding operation, the molding compound flows within the die set to fill the die cavity. The increased viscosity of B-staged molding compounds inhibits segregation of the various components of the molding compound during flow and promotes compositional uniformity of the composite over the entire volume of the structure.

Vinyl ester resins which are now used in such B-staged compositions are especially modified during their manufacture to make B-staging possible. After the resin is formed, it is treated in an additional manufacturing step with a cyclic anhydride, such as maleic or phthalic anhydride, to form half acids by combination with the free hydroxyl groups on the vinyl ester. The resulting resin is a polyfunctional carboxylic acid which is capable of forming a reversible cross-linked network when treated with an alkaline earth oxide such as magnesium oxide. This network completely imbibes the styrene monomer contained in the resin solution forming a homogeneous gel.

SUMMARY OF THE INVENTION

Vinyl ester resin compositions which can be thickened or B-staged with the addition of magnesium oxide include a vinyl ester resin, a reactive diluent and a thickening agent which is the reaction product of a polyethylene oxide and the anhydride of a polycarboxylic acid wherein that reaction product has more than two free carboxyl groups per molecule.

DETAILED DESCRIPTION OF THE INVENTION

Broadly defined, the vinyl ester resins of the present invention are prepared by contacting a polyepoxide with an ethylenically unsaturated monocarboxylic acid to produce a reaction product which contains, in part, the functional group

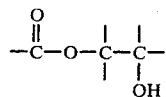

produced by the interaction of an epoxide group with a carboxylic acid group. The resulting vinyl ester resin may then be admixed with a polymerizable monomer containing a $>C=CH_2$ group.

Any of the known polyepoxides can be employed in the preparation of the vinyl ester resins of this invention. Useful polyepoxides are glycidyl polyethers of both polyhydric alcohols and polyhydric phenols, epoxy novolacs, epoxidized fatty acids or drying oil acids, epoxidized diolefins, epoxidized di-unsaturated acid esters, epoxidized unsaturated polyesters and mixtures thereof so long as they contain more than one epoxide group per molecule. The polyepoxides may be monomeric or polymeric.

Within the scope of this invention, a number of polyepoxide modifications can be readily made. It is possible to increase the molecular weight of the polyepoxide by polyfunctional reactants which react with the epoxide group and serve to link two or more polyepoxide molecules. A dicarboxylic acid, for example, can be reacted with a diepoxide, such as the diglycidyl ether of a bisphenol, in such a manner so as to join two or more diepoxide molecules and still retain terminal epoxide groups. Other polyfunctional reactants include diisocyanates, dicarboxylic acid anhydrides and those reactants which contain functional groups which will react with the epoxide group.

Where polyhydric phenols are selected to prepare the polyepoxide, many structural embodiments are possible. Polyepoxides prepared from polyhydric phenols may contain the bisphenol structural group wherein the phenyl groups are connected with a divalent hydrocarbon radical or

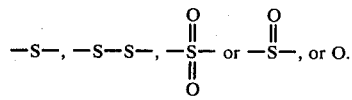

The choice of novolac resins leads to a separate, well recognized class of epoxy novolac resins. Other modifications are well known to those skilled in the art.

Further, it is well recognized that flame retardancy properties can be obtained by the introduction of phosphorus and halogen into the epoxy resin itself or by the selection of fillers, extenders, curing agents and the like which contribute to the flame retardant properties. For example, high levels of bromine can be introduced into the resin by the use of tetrabromo bisphenol A.

The polyepoxides referred to as epoxidized diolefins, epoxidized fatty acids, etc., are generally made by the known peracid method wherein the reaction is one of epoxidation of compounds with isolated double bonds at a controlled temperature so that the acid resulting from the peracid does not react with the resulting epoxide group to form ester linkages and hydroxyl groups. Preparation of polyepoxides by the peracid method is described in various periodicals and patents and such compounds as butadiene, ethyl linoleate, polyunsaturated drying oils or drying oil esters can all be converted to polyepoxides.

While the invention is applicable to polyepoxides generally, preferred polyepoxides are glycidyl polyethers of polyhydric alcohols or polyhydric phenols having weights per epoxide group of 150 to 2000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group, i.e., a 1,2-epoxy equivalency greater than one.

Ethylenically unsaturated monocarboxylic acids suitable for reaction with the polyepoxide include the $\alpha,\beta$-unsaturated monocarboxylic acids and the hydroxyalkyl acrylate or methacrylate half esters of dicarboxylic acids. The $\alpha,\beta$-unsaturated monocarboxylic acids include acrylic acid, methacrylic acid, crotonic acid, cinnamic acid and the like. The hydroxyalkyl groups of the acrylate or methacrylate half esters preferably contain from two to six carbon atoms and includes such groups as hydroxyethyl, beta-hydroxypropyl, beta-hydroxybutyl and the like. It is also intended to include those hydroxyalkyl groups in which an ether oxygen is present.

The vinyl ester resins are commercially available products. If a particular vinyl ester resin is desired and is not available, it can be easily prepared. In that preparation, the polyepoxide is reacted with the ethylenically unsaturated monocarboxylic acid either with or without a solvent at a temperature of 20° to 120° C. The reaction may also be conducted in the presence or absence of suitable catalysts such as alcoholates, tertiary amino phenols or others well known to the art. Preferably, the polyepoxide is added in an amount sufficient to provide about 0.8 to 1.2 equivalents of epoxide per equivalent of carboxylic acid. The reaction is continued until the acid content (as —COOH) drops below about 2 percent by weight.

Vinyl ester resins are frequently diluted with a vinyl monomer to lower the resin viscosity for ease of formulating with additives, to adjust the cross-linking density or for other reasons. A wide selection of polymerizable monomers is available. Representative species are the vinyl aromatic compounds which include such monomers as styrene, vinyl toluene, halogenated styrenes, divinylbenzene and the like.

Other valuable monomers include the methyl, ethyl, isopropyl, octyl, etc., esters of acrylic or methacrylic acid, vinyl acetate, diallyl maleate, dimethallyl fumarate, acidic monomers such as acrylic acid, methacrylic acid, crotonic acid and amide monomers such as acrylamide, N-alkyl acrylamides and the like and mixtures thereof.

Preferred polymerizable monomers are styrene, vinyl toluene, ortho-, meta- and para-halostyrenes, the various alpha-substituted styrenes, as well as the acrylic, methacrylic and crotonic acid esters which include both the saturated alcohol esters and the hydroxyalkyl esters.

The blended vinyl ester resin composition may consist of up to 70 percent by weight of polymerizable monomer with the balance of the combined weight consisting of said vinyl ester resin. Preferably, the resin composition consists of 30–60 percent by weight of said monomer and 70–40 percent by weight of said vinyl ester resin.

The thickening agent of this invention is an acid functionalized oxyalkylene polymer. In the polymer, the oxyalkylene portion has recurring units principally of ethylene oxide and preferably are polyethylene oxide. Copolymeric chains of ethylene oxide with minor amounts of propylene oxide or butylene oxide are useful. The amount of propylene oxide or butylene oxide must not exceed that amount where compatibility with the vinyl ester resin is lost. Such compatibility is easily determined by single preliminary experiment. Also useful are those compounds having multiple polyoxyethylene chains such as result when a triol, e.g., glycerol, is used as the initiator.

The number average molecular weight of the oxyalkylene portion should be greater than about 2000. Below that molecular weight there is insufficient thickening using practical amounts of thickener.

The thickener must have more than two free carboxylic acid groups per molecule of thickener. Less than two acid groups do not permit formation of a gel network when a difunctional additive, such as a divalent magnesium, is added to the formulation. Useful acids that can be used to form the thickeners include trimellitic anhydride, pyromellitic anhydride and 3,3',4,4'-tetracarboxylic dianhydride of benzophenone. When glycerol initiated polyoxyethylene compounds are used, the acids may be difunctional, such as terephthalic acid.

The thickeners are prepared using known esterification procedures and techniques. Completion of the reaction is readily determined by the absence of the anhydride carbonyl band in the infrared spectrum.

Other ingredients may be included in the formulation with the vinyl ester resin, reactive diluent and thickener. Typical of such ingredients are low profile additives, fillers, pigments and dyes. Any such additive should not be reactive with the carboxyl groups of the thickener.

The thickened vinyl ester resin compositions are useful in forming B-staged compositions for bulk molding and sheet molding fabrication procedures. The thickened compositions can be readily B-staged by the addition of magnesium oxide.

The compositions are formulated by thoroughly mixing the thickener, reactive diluent and vinyl ester resin to form a solution. Following that, the fillers and other additives and the polymerization catalyst to cure the vinyl ester resin are added. The magnesium oxide is next incorporated into the blend after which any reinforcement such as glass fibers is added. It is preferred to let the compositions stand for about 24 hours to maturate.

The compositions are useful in all procedures requiring a thickened vinyl ester resin. Representative of such procedures are bulk molding and sheet molding.

The concept of the invention is illustrated in the following examples wherein all parts and percentages are by weight.

In the examples, the following materials were employed.

RESIN A

A vinyl ester resin composed of 35 percent styrene and 65 percent of an adduct of 1.0 equivalent methacrylic acid, 0.25 equivalent of the diglycidyl ether of bisphenol A (EEW = 182–190) and 0.75 equivalent of a polyglycidyl ether of a novolac having an average functionality of 2.6 and an EEW of 176–181.

RESIN B

A vinyl ester resin composed of 45 percent styrene and 55 percent of an adduct of 1.00 equivalent of methacrylic acid, 0.14 equivalent of maleic anhydride, 0.57 equivalent of the diglycidyl ether of bisphenol A (EEW = 182–190) and a solid diglycidyl ether of a bisphenol A (EEW = 475–575).

EMULSIFIER SOLUTION

A 34 percent solution of poly(styrene-b-ethylene oxide) triblock of composition $EO_{100}S_{200}EO_{100}$ in styrene prepared by the process of U.S. Pat. No. 3,836,600.

CALCIUM CARBONATE

Water ground limestone filler with average particle size of $3\mu$ sold commercially as Camel Wite.

MAGNESIUM OXIDE

Sold commercially as Maglite D.

LOW PROFILE ADDITIVE SOLUTION

A 37.5 percent solution of low profile additive in styrene sold commercially as Vinyl Ester Additive 750.

GLASS

One-fourth inch chopped strand sold commercially as K-832.

Typical materials used in the examples as thickeners include the following.

  (I)

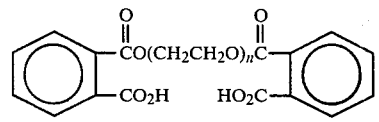  (II)

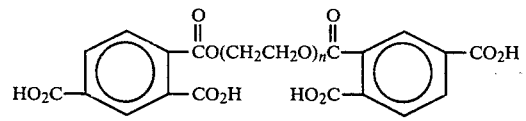  (III)

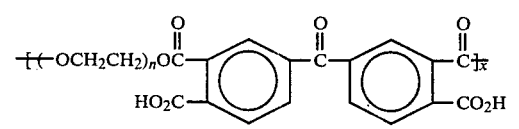  (IV)

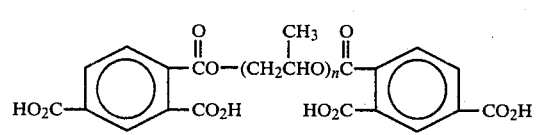  (V)

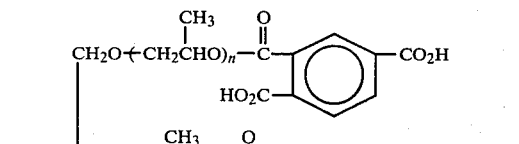  (VI)

EXAMPLE 1

A formulation was prepared by blending 71.1 parts Resin A, 23.9 parts styrene, 5 parts thickener and 2.5 parts magnesium oxide. Initial viscosities were measured at 25° C. before the magnesium oxide was added. The viscosities were measured using a Brookfield RVT viscometer with spindle #4 at 50 rpm. Final viscosities were measured at room temperature using a Brookfield RVT viscometer mounted on a Helipath stand using T-bar TF at 1 rpm.

The results are listed in the following table.

TABLE I

| Thickener Identification | | Viscosity of Test Formulation (cps) | | |
|---|---|---|---|---|
| Structure No. | Mn of Polyglycol Component | Initial | After 24 Hr. | Appearance of Test Resin After 24 Hr. |
| Comparison | | | | |
| None | — | 76 | $0.11 \times 10^6$ | Viscous liquid |
| I | 7500 | 98 | $0.16 \times 10^6$ | Viscous liquid |
| II | 7500 | 138 | $0.18 \times 10^6$ | Viscous liquid |
| III | 2100 | 116 | — | Fluid liquid |
| V | 2048 | 128 | $0.31 \times 10^6$ | Granular discontinuous gel |
| VI | 3000 | 124 | $0.46 \times 10^6$ | Granular discontinuous gel |
| This Invention | | | | |
| III | 7500 | 168 | $3.9 \times 10^6$ | Clear, homogeneous gel |
| IV | 7500 | 240 | $4.5 \times 10^6$ | Clear, homogeneous gel |
| IV | 4500 | 204 | $2.9 \times 10^6$ | Clear, homogeneous gel |

EXAMPLE 2

Preparation of Thickening Agent

Trimellitic anhydride (8.96 g, 46.7 mmoles) and 175 g (23.3 mmoles) of poly(ethylene oxide), a polymer with Mn of 7500, sold commercially as Dow E-6000, were stirred in a 250-ml resin flask at 102° to 111° C. for 5.5 hours in a nitrogen atmosphere. The hot, clear, colorless liquid was poured into a Teflon lined pan and allowed to solidify into a waxy white solid. The solid was ground into a white powder in a Wiley mill. The infrared spectrum of the product showed the complete disappearance of the anhydride carbonyl bands indicating complete reaction of the trimellitic anhydride. Henceforth, in this proposal, this adduct will be referred to as "Thickener IIIa."

Thickening a Vinyl Ester Resin

Three 50 g samples of Resin A and Thickener IIIa were prepared. The samples contained 1, 3 and 5 weight percent of thickener, respectively, and had the following overall composition expressed in weight fractions: X of Thickener IIIa, 0.486 (1-X) of vinyl ester solids and 0.514 (1-X) styrene. The solid thickener was dissolved in the liquid resin by warming on a steam bath. The clear amber solutions were cooled to 25° C. and their viscosities measured using a Brookfield RVT viscometer with spindle #4 at 50 rpm. Maglite D magnesium oxide (1.25 g) was added to each sample and the mixtures thoroughly stirred on a Hamilton Beach mixer. After standing at room temperature for 24 hours, the samples became clear, amber, homogeneous gels. Their viscosities were measured using a Brookfield RVT viscometer on a Helipath stand with T-bar TF at 1 rpm. The table below shows both the initial and final viscosities.

| % Thickener | Initial Viscosity, cps | Viscosity After 24 Hrs., cps |
|---|---|---|
| 1 | 102 | $0.10 \times 10^6$ |

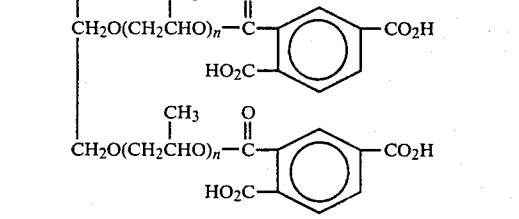

| % Thickener | Initial Viscosity, cps | Viscosity After 24 Hrs., cps |
|---|---|---|
| 3 | 142 | $1.41 \times 10^6$ |
| 5 | 168 | $3.85 \times 10^6$ |

EXAMPLE 3

The Preparation and Molding of a Bulk Molding Compound Containing Thickener IIIa

| Formulation | Parts | Wt (g) |
|---|---|---|
| Vinyl Ester Resin B | 100 | 640 |
| Thickener | 5 | 32 |
| t-Butyl Peroctoate | 1 | 6.4 |
| Zinc Stearate | 4 | 25.6 |
| CaCO$_3$ Filler (a) | 212.5 | 1360 |
| MgO | 1.25 | 8 |
| ¼ Inch Chopped Strand Glass (b) | 78.1 | 500 |

(a) Resin/filler - 32/68
(b) Resin and filler/glass - 80/20

Thickener IIIa was dissolved in the vinyl ester resin by warming the resin. The solution was cooled to room temperature. The t-butyl peroctoate, zinc stearate and calcium carbonate were mixed with the resin solution using a Cowles mixer to yield a liquid resin paste having a viscosity of 26,300 cps at 30° C. The viscosity was measured using a Brookfield Model RVT viscometer with T-bar TB at 5 rpm. Then the magnesium oxide was thoroughly mixed in the paste using the Cowles mixer. Immediately, the resin paste was combined with the glass reinforcement in a Baker-Perkins sigma blade mixer. The completed molding compound was packed into 500-g balls, placed in a covered can and allowed to maturate at room temperature for 24 hours. In a separate experiment, the viscosity of the paste was found to increase to $26.5 \times 10^6$ cps under these conditions. After 24 hours, the BMC balls were firm and had dry, nonsticky surfaces. These were compression molded into $13 \times 13 \times 0.1$-in. flat sheets at 270° F. and 100 tons for two minutes. The panels had hard, glossy surfaces which were not stained by marker ink. Close inspection of the panels with strong back lighting revealed uniform glass distributions over the entire area of the panels.

EXAMPLE 4

Preparation and Molding of a Low Profile Bulk Molding Compound Containing Thickener IIIa

| Formulation | Parts | Wt (g) |
|---|---|---|
| Vinyl Ester Resin A | 69.2 | 442.9 |
| Styrene | 4.1 | 26.2 |
| 37.5% Solution of Polystyrene in Styrene (a) | 26.7 | 170.9 |
| Thickener IIIa | 7 | 44.8 |
| 34% Emulsifier Solution | 1.5 | 9.4 |
| t-Butyl Perbenzoate | 1 | 6.4 |
| Zinc Stearate | 4 | 25.4 |
| CaCO$_3$ Filler (b) | 212.5 | 1360 |
| MgO | 1.75 | 11.2 |
| ¼ In. Chopped Strand Glass | 78.1 | 500 |

(a) Vinyl ester solids/styrene/polystyrene - 45/45/10
(b) Resin/filler - 32/68

Bulk molding compound (BMC) was prepared using this formulation and the procedure described in Example 3. The resin paste had a viscosity of 63,000 cps (30° C.) before addition of the magnesium oxide and it thickened to a viscosity of $54 \times 10^6$ cps (25° C.) in 40 hours. The BMC balls were firm with dry, nonsticky surfaces. They were compression molded into $13 \times 13 \times 0.1$-in. flat sheets at 300° F. and 100 tons for 90 seconds. Good quality panels were produced. Their surfaces were hard and glossy. There were no visual signs of any component segregation over the entire area of the panels.

EXAMPLE 5

| Formulation | |
|---|---|
| Ingredient | Parts |
| Vinyl Ester Resin A | 65 |
| Low Profile Additive Solution | 35 |
| t-Butyl Perbenzoate | 1 |
| Zinc Stearate | 4 |
| 34% Emulsifier Solution | 1.5 |
| Calcium Carbonate | 150 |
| Magnesium Oxide | 2.5 |
| Thickener IIIa | X |

These samples were placed in a constant temperature bath at 30° C. and their viscosities periodically measured using a Brookfield RVT or HBT viscometer mounted on a Helipath stand with T-bar TF at 1 rpm. Table III lists the viscosities recorded after 1 and 13 days.

TABLE III

| Thickener Level phr* | Viscosity cps $\times 10^6$ | |
|---|---|---|
| | 1 day | 13 days |
| 0 | 1.7 | 2.8 |
| 3 | 1.5 | 0.9 |
| 5 | 14.3 | 15.3 |
| 7 | 28.8 | 31.6 |
| 10 | 41.6 | 46.4 |

*Based on vinyl ester resin plus low profile additive.

The viscosity desired for sheet molding compound depends on the individual application but generally falls within the range of 20 to $100 \times 10^6$ cps. For the low profile SMC paste listed about 7 phr thickener would be required. For the bulk molding compound formulation listed in Example 3, 5 phr of Thickener IIIa was sufficient. Thus, the range of 3 to 10 phr of thickener per 100 parts of resin (or resin plus low profile additive in low profile compositions) probably encompasses the most desirable operating range.

What is claimed is:

1. A curable polymer composition capable of being B-staged with the addition of magnesium oxide, said composition comprising (1) a curable resin having no free carboxyl groups and which is the reaction product of about equivalent amounts of an unsaturated monocarboxylic acid and a polyglycidyl ether, (2) a reactive diluent and (3) a thickening agent which is a polyether having terminal carboxyl groups and repeating groups consisting essentially of ethoxy moieties, said polyether being, the reaction product of a polyethylene oxide having a molecular weight greater than about 4,500 and the anhydride of a polycarboxylic acid, said thickening agent having more than two carboxyl groups per molecule.

2. The composition of claim 1 wherein said thickening agent is present in an amount of from 3 to 10 parts per 100 parts of said resin.

3. The composition of claim 1 wherein said unsaturated acid is acrylic acid or methacrylic acid.

4. The composition of claim 1 wherein said polyglycidyl ether is the diglycidyl ether of bisphenol A.

5. The composition of claim 1 wherein said polyglycidyl ether is the polyglycidyl ether of a novolac.

6. The composition of claim 1 wherein said reactive diluent is styrene.

7. The composition of claim 1 wherein said reactive diluent is dicyclopentadienyl acrylate.

8. The composition of claim 1 wherein said reactive diluent is an alkyl acrylate.

9. The composition of claim 1 wherein said reactive diluent is a hydroxyalkyl acrylate.

10. The composition of claim 1 wherein said anhydride is trimellitic anhydride.

11. The composition of claim 1 wherein said anhydride is benzophenone tetracarboxylic anhydride.

12. A B-staged curable resin composition containing the composition of claim 1 plus magnesium oxide in an amount greater than 0.1 part per 5 parts of said thickener.

* * * * *